(12) United States Patent
Sano et al.

(10) Patent No.: US 8,614,839 B2
(45) Date of Patent: Dec. 24, 2013

(54) IMAGE READER, AUTO DOCUMENT FEEDER, AND IMAGE FORMING APPARATUS CAPABLE OF GENERATING SHADING DATA

(75) Inventors: Motoya Sano, Zama (JP); Takashi Fujii, Yokohama (JP); Hiroshi Kubo, Kawasaki (JP); Shinya Kitaoka, Kawasaki (JP); Takeshi Akai, Yokohama (JP); Atsushi Kanaya, Yokohama (JP); Shingo Matsushita, Tokyo (JP); Norio Kimura, Sagamihara (JP); Kenichiro Morita, Ebina (JP)

(73) Assignee: Ricoh Company, Ltd., Tokyo (JP)

( * ) Notice: Subject to any disclaimer, the term of this patent is extended or adjusted under 35 U.S.C. 154(b) by 717 days.

(21) Appl. No.: 12/458,875

(22) Filed: Jul. 27, 2009

(65) Prior Publication Data
US 2010/0027081 A1    Feb. 4, 2010

(30) Foreign Application Priority Data

Jul. 30, 2008    (JP) ................................. 2008-195821

(51) Int. Cl.
*H04N 1/04*    (2006.01)
*H04N 1/40*    (2006.01)

(52) U.S. Cl.
USPC ............ 358/461; 358/496; 358/498; 358/474

(58) Field of Classification Search
USPC .......... 358/496, 498, 461, 474; 399/211, 367, 399/371; 382/274
See application file for complete search history.

(56) References Cited

U.S. PATENT DOCUMENTS

| 5,396,319 | A * | 3/1995 | Tokuhashi et al. | 399/351 |
| 6,295,140 | B1 * | 9/2001 | Kameyama | 358/461 |
| 7,212,320 | B2 * | 5/2007 | Imoto | 358/497 |
| 7,917,060 | B2 * | 3/2011 | Miura | 399/121 |

FOREIGN PATENT DOCUMENTS

| JP | 3-111066 | | 11/1991 |
| JP | 06-006589 | | 1/1994 |
| JP | 07-107283 | | 4/1995 |
| JP | 2000075768 A | * | 3/2000 |
| JP | 2002-185725 | | 6/2002 |
| JP | 2003-060907 | | 2/2003 |
| JP | 2003-219124 | | 7/2003 |
| JP | 2004129139 A | * | 4/2004 |
| JP | 2006-93980 | | 4/2006 |
| JP | 2009284323 A | * | 12/2009 |

OTHER PUBLICATIONS

Japanese Office Communication dated Jan. 19, 2012, issued in Japanese Patent Application No. 2008-195821.

* cited by examiner

*Primary Examiner* — Cheukfan Lee
(74) *Attorney, Agent, or Firm* — Harness, Dickey & Pierce P.L.C.

(57) ABSTRACT

In an image reader, a reading member fixedly mounted in the image reader reads an image on a sheet conveyed into the image reader. A guide is disposed opposite the reading member to support the sheet with respect to the reading member. A guide moving member moves the guide with respect to the reading member in a main scanning direction in which the reading member reads the image on the sheet. A guide rotating member rotates the guide in a sub-scanning direction perpendicular to the main scanning direction. A controller controls the reading member to scan different positions on the guide moved by the guide moving member and rotated by the guide rotating member to generate shading data.

19 Claims, 9 Drawing Sheets

IMAGE READER, AUTO DOCUMENT FEEDER, AND IMAGE FORMING APPARATUS CAPABLE OF GENERATING SHADING DATA

PRIORITY STATEMENT

The present patent application claims priority from Japanese Patent Application No. 2008-195821, filed on Jul. 30, 2008, in the Japan Patent Office, the entire contents of which are hereby incorporated herein by reference.

BACKGROUND OF THE INVENTION

1. Field of the Invention

Example embodiments generally relate to an image reader, an auto document feeder, and an image forming apparatus, and more particularly, to an image reader for reading an image on a sheet, an auto document feeder (ADF) including the image reader, and an image forming apparatus including the auto document feeder, for example.

2. Description of the Related Art

Related-art image forming apparatuses, such as copiers, facsimile machines, printers, or multifunction printers having at least one of copying, printing, scanning, and facsimile functions, typically form an image on a recording medium (e.g., a sheet) according to image data generated by reading an image on an original document. Thus, for example, a mobile image reader mounted on a moving mount scans an image on an original document. Alternatively, a stationary image reader scans an image on an original document conveyed at a constant speed.

Such image readers typically also scan a reference board to generate shading data for correction of the image data. In order to generate proper shading data, the reference board must be free of dirt and debris. When the reference board is stained with toner or the like, or some other foreign substance adheres to any part of the reference board, the image reader cannot generate shading data properly.

To address this problem, the mobile image reader on the moving mount can move until the image reader is able to find and scan a clean part of the reference board to generate uncontaminated shading data. Obviously, however, this remedy is not available to stationary image readers, which always generate shading data from the same location. The reference board may be rotatably connected to an arm provided with a motor-driven rotating member to move the reference board to an image sensor only when the image sensor scans the reference board. The reference board separates from the image sensor when the image sensor reads an image on an original document to keep the reference board free from foreign substances originating from the original document. A drawback of this arrangement, however, is that the image sensor has only a shallow depth of focus, and therefore a very small gap must be maintained between the image sensor and the original document. Great precision is needed to rotate the reference board into this small gap. Such precision comes with increased manufacturing costs.

Alternatively, the image reader may be configured to scan a guide roller that is the equivalent of the reference board, divide data obtained by scanning the outer surface of the guide roller for one rotation of the guide roller into a plurality of blocks, and detect a peak value in each block, with the average of the readings of the block having the highest peak value used as shading data. However, when the entire outer surface of the guide roller is stained, the image reader cannot generate proper shading data.

SUMMARY

At least one embodiment may provide an image reader that includes a reading member, a guide, a guide moving member, a guide rotating member, and a controller. The reading member is fixedly mounted in the image reader to read an image on a sheet conveyed into the image reader. The guide is disposed opposite the reading member to support the sheet with respect to the reading member. The guide moving member moves the guide with respect to the reading member in a main scanning direction in which the reading member reads the image on the sheet. The guide rotating member rotates the guide in a sub-scanning direction perpendicular to the main scanning direction. The controller controls the reading member to scan different positions on the guide moved by the guide moving member and rotated by the guide rotating member to generate shading data.

At least one embodiment may provide an auto document feeder that includes an image reader including a reading member, a guide, a guide moving member, a guide rotating member, and a controller. The reading member is fixedly mounted in the image reader to read an image on a sheet conveyed into the image reader. The guide is disposed opposite the reading member to support the sheet with respect to the reading member. The guide moving member moves the guide with respect to the reading member in a main scanning direction in which the reading member reads the image on the sheet. The guide rotating member rotates the guide in a sub-scanning direction perpendicular to the main scanning direction. The controller controls the reading member to scan different positions on the guide moved by the guide moving member and rotated by the guide rotating member to generate shading data.

At least one embodiment may provide an image forming apparatus that includes an auto document feeder including an image reader. The image reader includes a reading member, a guide, a guide moving member, a guide rotating member, and a controller. The reading member is fixedly mounted in the image reader to read an image on a sheet conveyed into the image reader. The guide is disposed opposite the reading member to support the sheet with respect to the reading member. The guide moving member moves the guide with respect to the reading member in a main scanning direction in which the reading member reads the image on the sheet. The guide rotating member rotates the guide in a sub-scanning direction perpendicular to the main scanning direction. The controller controls the reading member to scan different positions on the guide moved by the guide moving member and rotated by the guide rotating member to generate shading data.

Additional features and advantages of example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
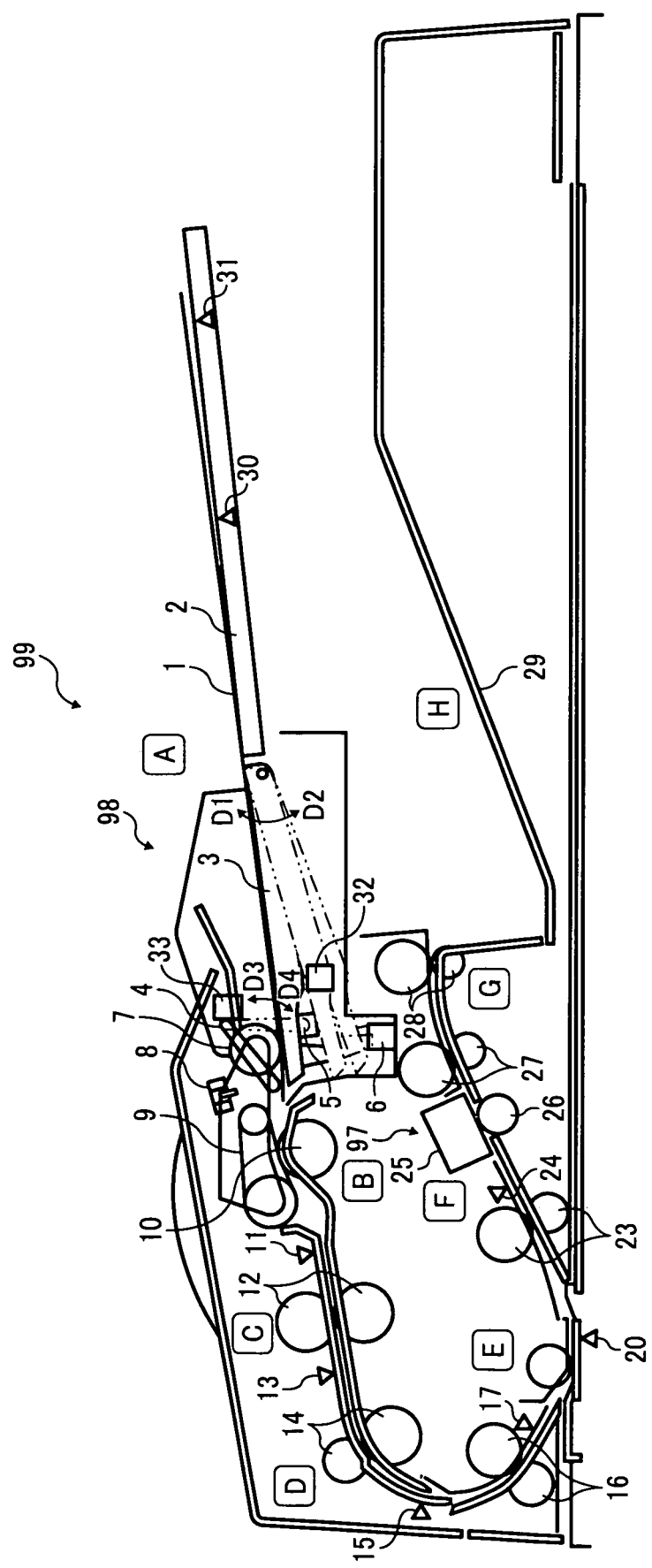
FIG. 1 is a schematic view of an image forming apparatus according to an example embodiment.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The terminology used herein is for the purpose of describing particular embodiments only and is not intended to be limiting of the present invention. As used herein, the singular forms a "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner.

Referring now to the drawings, wherein like reference numerals designate identical or corresponding parts throughout the several views, particularly to FIG. 1, an image forming apparatus 99 according to an example embodiment is explained.

FIG. 1 is a schematic view of the image forming apparatus 99. As illustrated in FIG. 1, the image forming apparatus 99 includes an auto document feeder (ADF) 98.

The ADF 98 includes an original set portion A, a separate-feed portion B, a registration portion C, a turning portion D, a first read-convey portion E, a second read-convey portion F, an original discharge portion G, and/or an original stack portion H.

The original set portion A includes an original tray 2, a movable original tray 3, a set feeler 4, a set sensor 5, a bottom plate home position A sensor 6, a pickup roller 7, a feeding position sensor 8, original length sensors 30 and 31, a bottom plate home position B sensor 32, and/or an original angle sensor 33.

The separate-feed portion B includes a feeding belt 9 and/or a reverse roller 10.

The registration portion C includes a registration sensor 11, a pull-out roller pair 12, and/or an original width sensor 13.

The turning portion D includes an intermediate roller pair 14.

The first read-convey portion E includes an entrance sensor 15, an entrance roller pair 16, a registration sensor 17, and/or an exit roller pair 23.

The second read-convey portion F includes an image reader 97, a discharging sensor 24, and/or a CIS (contact image sensor) exit roller pair 27. The image reader 97 includes a second reading member 25 and/or a second reading roller 26.

The original discharge portion G includes a discharging roller pair 28.

The original stack portion H includes an original discharge tray 29.

Figure 2:
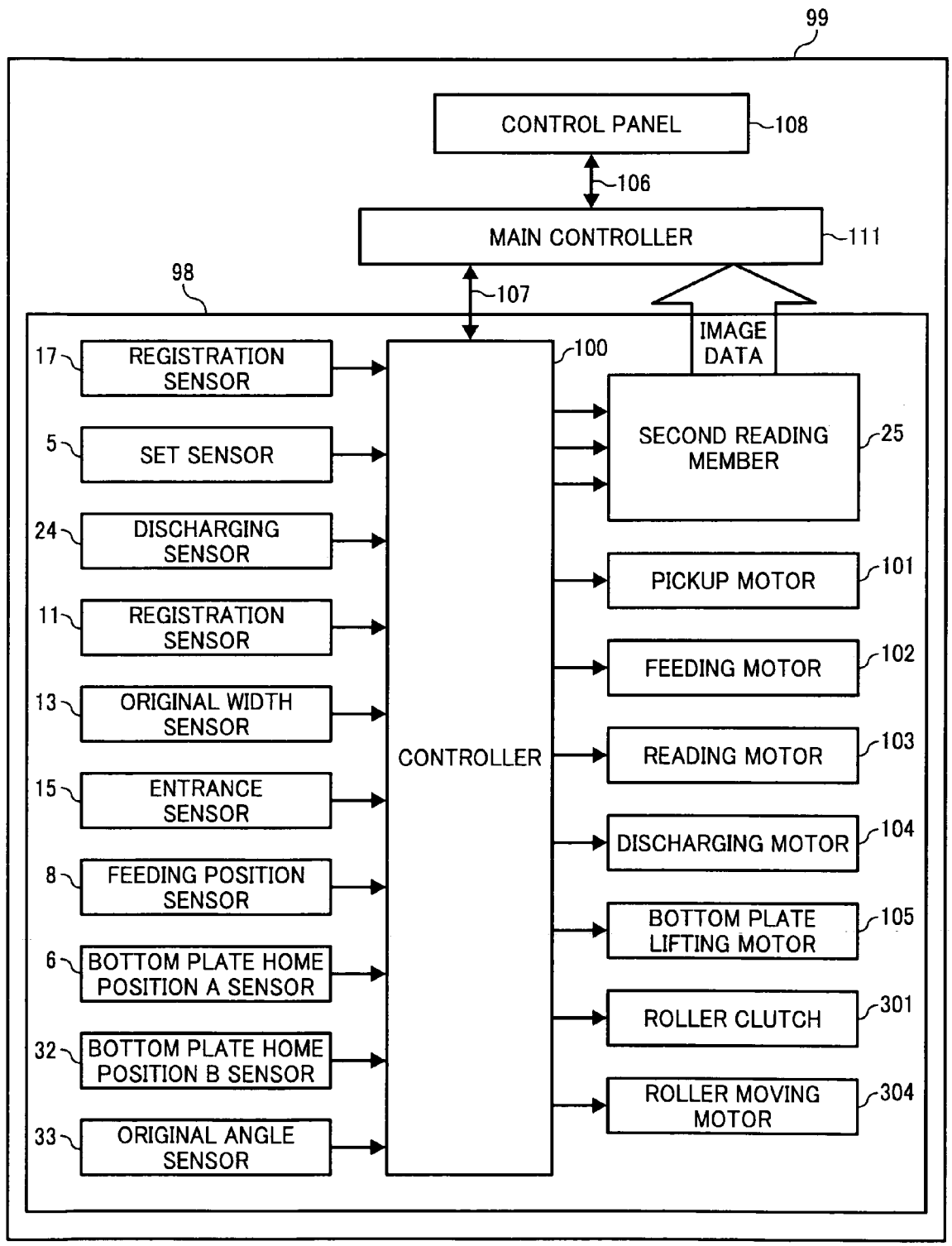
FIG. 2 is a block diagram (according to an example embodiment) of the image forming apparatus shown in FIG. 1.

FIG. 2 is a block diagram of the image forming apparatus 99. As illustrated in FIG. 2, the image forming apparatus 99 further includes interfaces (I/F) 106 and 107, a control panel 108, and/or a main controller 111. The ADF 98 further includes a controller 100, a pickup motor 101, a feeding motor 102, a reading motor 103, a discharging motor 104, a bottom plate lifting motor 105, a roller clutch 301, and/or a roller moving motor 304.

Figure 3:
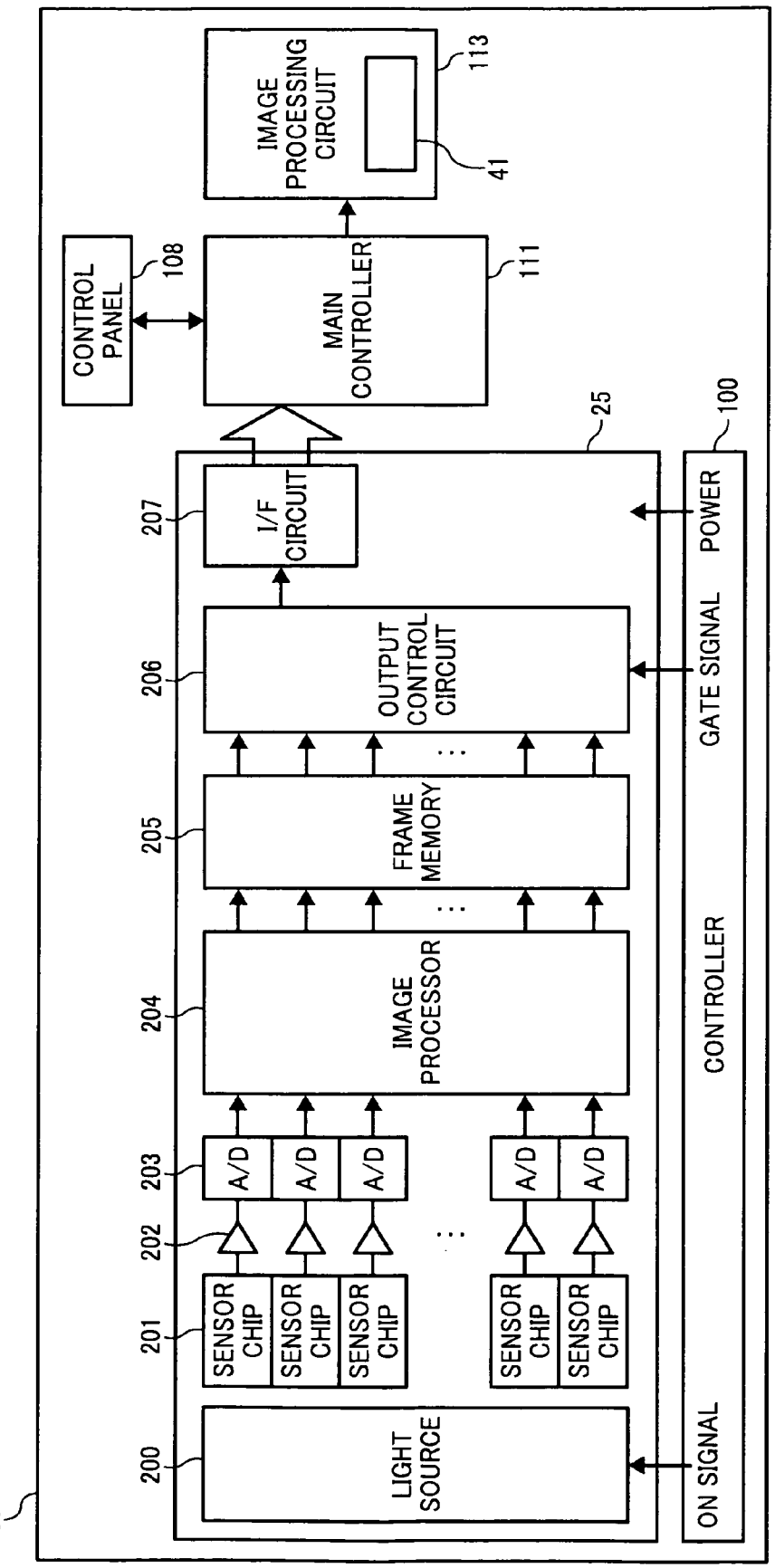
FIG. 3 is a block diagram (according to an example embodiment) of a second reading member and an image processing circuit included in the image forming apparatus shown in FIG. 2.

FIG. 3 is a block diagram of the image forming apparatus 99. As illustrated in FIG. 3, the image forming apparatus 99 further includes an image processing circuit 113. The image processing circuit 113 includes a white shading correction circuit 41. The second reading member 25 includes a light source 200, a CCD (charge-coupled device) sensor chip 201, an amplifier 202, an A/D (analog/digital) converter 203, an image processor 204, a frame memory 205, an output control circuit 206, and/or an I/F (interface) circuit 207.

The image forming apparatus 99 can be a copier, a facsimile machine, a multifunction printer having at least one of copying, printing, scanning, plotter, and facsimile functions, or the like. According to this example embodiment of the present invention, the image forming apparatus 99 functions as a copier for forming an image on a recording medium.

As illustrated in FIG. 1, in the ADF 98, an original document 1 is conveyed to the image reader 97 fixedly mounted in the ADF 98, and the image reader 97 reads an image on the original document 1 while the original document 1 is conveyed at a given speed.

In the ADF 98, original documents 1 are set in the original set portion A. The separate-feed portion B separates an original document 1 from other original documents 1 set in the original set portion A to feed the separated original document 1 toward the registration portion C. The registration portion C aligns the original document 1 which contacts the registration portion C and feeds the aligned original document 1 toward the turning portion D. The turning portion D turns the original document 1 and feeds the original document 1 toward the first read-convey portion E in such a manner that an image on a front side of the original document 1 faces down. The first read-convey portion E reads the image on the front side of the original document 1 facing down through an exposure glass, and feeds the original document 1 toward the second read-convey portion F. The second read-convey portion F reads an image on a back side of the original document 1 after the first read-convey portion E reads the image on the front side of the original document 1, and feeds the original document 1 toward the discharging portion G. The discharging portion G discharges the original document 1 toward the original stack portion H. The original stack portion H receives and stacks the original document 1.

As illustrated in FIG. 2, the pickup motor 101, the feeding motor 102, the reading motor 103, the discharging motor 104, and the bottom plate lifting motor 105 serve as drivers for driving the original set portion A, the separate-feed portion B, the registration portion C, the turning portion D, the first read-convey portion E, the second read-convey portion F, the original discharge portion G, and the original stack portion H depicted in FIG. 1 to feed the original document 1. The controller 100 controls operations of the ADF 98.

The roller clutch 301 and the roller moving motor 304 are connected to the controller 100. The controller 100 turns on and off the roller clutch 301 to transmit and refrain from transmitting a rotation force generated by the reading motor 103 to the second reading roller 26 depicted in FIG. 1. The roller moving motor 304 moves the second reading roller 26 in an axial direction of the second reading roller 26, and is provided as needed.

As illustrated in FIG. 1, in the original set portion A, a plurality of original documents 1 is placed on the original tray 2 and the movable original tray 3 facing up. A side guide aligns the plurality of original documents 1 in a width direction of the plurality of original documents 1, that is, a direction perpendicular to a sheet conveyance direction (e.g., an original document conveyance direction). The set feeler 4 and the set sensor 5 detect the plurality of original documents 1 placed on the original tray 2 and the movable original tray 3, and send a detection signal to the main controller 111 via the I/F 107 depicted in FIG. 2.

For example, the set feeler 4 includes encoder slits which detect a swing angle of the set feeler 4. When the original documents 1 are not set on the movable original tray 3, the set sensor 5 detects an end of the set feeler 4. When the original documents 1 are set on the movable original tray 3, a number of the encoder slits which pass through a light axis of the original angle sensor 33 is counted to detect the swing angle of the set feeler 4. A height of the original documents 1 set on the movable original tray 3 is estimated based on the detected swing angle of the set feeler 4. Thus, a number of the original documents 1 is estimated based on the estimated height of the original documents 1.

The original length sensors 30 and 31 are provided on the original tray 2, and may be reflection sensors or actuator sensors which can even detect a single original document 1. The original length sensor 30 or 31 detects length of an original document 1 in the sheet conveyance direction. The original length sensors 30 and 31 are provided to at least detect orientation of a plurality of original documents 1 of an identical size placed on the original tray 2, that is, portrait orientation or landscape orientation.

The bottom plate lifting motor 105 depicted in FIG. 2 lifts and lowers the movable original tray 3 in directions D1 and D2, respectively. When the set feeler 4 and the set sensor 5 detect that the plurality of original documents 1 is placed on the movable original tray 3, the controller 100 depicted in FIG. 2 rotates the bottom plate lifting motor 105 forward to lift the movable original tray 3 so that an uppermost original document 1 of the plurality of original documents 1 contacts the pickup roller 7.

The feeding position sensor 8 detects that a bottom plate of the movable original tray 3 is lifted enough to position the uppermost original document 1 at a proper height for feeding the uppermost original document 1. For example, when the feeding position sensor 8 is turned on, the controller 100 stops lifting the bottom plate of the movable original tray 3. When the feeding position sensor 8 is turned off after the height of the uppermost original document 1 lowers due to repeated feedings of the uppermost original documents 1, the controller 100 lifts the bottom plate of the movable original tray 3 so that the feeding position sensor 8 is turned on again. Thus, the uppermost original document 1 is constantly positioned at the proper height at which the uppermost original document 1 is fed by the pickup roller 7.

After the pickup roller 7 feeds all the original documents 1 placed on the movable original tray 3, the controller 100 rotates the bottom plate lifting motor 105 backward to lower the movable original tray 3 to a lowest home position or a middle home position at which next original documents 1 are set on the movable original tray 3.

For example, the controller 100 rotates the bottom plate lifting motor 105 backward to lower the movable original tray 3 until the bottom plate home position A sensor 6 detects the movable original tray 3. When the bottom plate home position A sensor 6 detects the movable original tray 3, the controller 100 stops the bottom plate lifting motor 105. Thus, the movable original tray 3 is lowered to the lowest home position.

Similarly, the controller 100 rotates the bottom plate lifting motor 105 backward to lower the movable original tray 3 until the bottom plate home position B sensor 32 detects the movable original tray 3. When the bottom plate home position B sensor 32 detects the movable original tray 3, the controller 100 stops the bottom plate lifting motor 105. Thus, the movable original tray 3 is lowered to the middle home position.

The pickup motor 101 depicted in FIG. 2 moves the pickup roller 7 in directions D3 and D4 via a cam. When the movable original tray 3 is lifted, the uppermost original document 1 placed on the movable original tray 3 pushes the pickup roller 7 in the direction D3. A lifted tray sensor detects the pickup roller 7 lifted up to an upper limit.

When a user presses a key on the control panel 108 depicted in FIG. 2 to select a one-sided mode or a two-sided mode and presses a start key, the control panel 108 sends an original feeding signal to the main controller 111 via the I/F 106 depicted in FIG. 2. The main controller 111 sends the original feeding signal to the controller 100 via the I/F 107 depicted in FIG. 2. The controller 100 rotates the feeding motor 102 depicted in FIG. 2 forward to rotate the pickup roller 7 so that the pickup roller 7 picks up several original documents 1, preferably a single original document 1, placed on the movable original tray 3. The pickup roller 7 rotates in a direction to feed an uppermost original document 1 toward the separate-feed portion B.

When the user selects the one-sided mode or the two-sided-mode, the user may select the one-sided mode for all original documents 1 placed on the original tray 2. Alternatively, the user may select the two-sided mode for all original documents 1 placed on the original tray 2. Yet alternatively, the user may select the different modes for original documents 1. For example, when ten original documents 1 are placed on the original tray 2, the user may select the two-sided mode for a first sheet and a tenth sheet and the one-sided mode for a second sheet to a ninth sheet.

In the separate-feed portion B, the feeding motor 102 depicted in FIG. 2 rotates forward to rotate the feeding belt 9 in the sheet conveyance direction and to rotate the reverse roller 10 in a direction opposite to the sheet conveyance direction. Thus, the feeding belt 9 and the reverse roller 10 separate an uppermost original document 1 from other original documents 1 below the uppermost original document 1 to feed the uppermost original document 1. For example, the reverse roller 10 applies reference pressure to the feeding belt 9. When the reverse roller 10 pressingly contacts the feeding belt 9 or when the reverse roller 10 presses against the feeding belt 9 via an original document 1, the reverse roller 10 rotates counterclockwise in FIG. 1 in accordance with rotation of the feeding belt 9. When the feeding belt 9 and the reverse roller 10 nip two or more original documents 1, a rotation force of the feeding belt 9 for rotating the reverse roller 10 is smaller than a torque of a torque limiter. Accordingly, the reverse roller 10 rotates clockwise in FIG. 1 in a default driving direction to feed back original documents 1 other than the uppermost original document 1 so as to prevent a plurality of original documents 1 from being fed toward the registration portion C simultaneously.

The feeding belt 9 feeds the uppermost original document 1 separated by the feeding belt 9 and the reverse roller 10 from other original documents 1 toward the registration portion C. In the registration portion C, the registration sensor 11 detects a leading edge of the original document 1, and the original document 1 contacts the pull-out roller pair 12 which stops rotating. Thereafter, the original document 1 is fed by a reference distance after the registration sensor 11 detects the leading edge of the original document 1. Accordingly, the original document 1 is contacted and bent by the pull-out roller pair 12 for a reference amount. The controller 100 depicted in FIG. 2 rotates the pickup motor 101 depicted in FIG. 2 to separate the pickup roller 7 from the original document 1 so that the feeding belt 9 feeds the original document 1. Accordingly, the leading edge of the original document 1 enters a nip portion formed between an upper roller and a lower roller of the pull-out roller pair 12. Thus, the pull-out roller pair 12 aligns the leading edge of the original document 1 to correct skew of the original document 1.

The pull-out roller pair 12 feeds the aligned original document 1 toward the intermediate roller pair 14 of the turning portion D. The feeding motor 102 depicted in FIG. 2 rotates backward to drive the pull-out roller pair 12. When the feeding motor 102 rotates backward, the pull-out roller pair 12 and the intermediate roller pair 14 are driven. However, the pickup roller 7 and the feeding belt 9 are not driven.

A plurality of original width sensors 13 is arranged in a depth direction corresponding to the width direction of the original document 1 fed by the pull-out roller pair 12 to detect size (e.g., width) of the original document 1 in the width direction of the original document 1 perpendicular to the sheet conveyance direction. The registration sensor 11 detects a leading edge and a trailing edge of the original document 1 to detect size (e.g., length) of the original document 1 in the sheet conveyance direction based on motor pulses.

When the pull-out roller pair 12 and the intermediate roller pair 14 feed the original document 1 from the registration portion C to the turning portion D, a conveying speed of the registration portion C for conveying the original document 1 is set faster than a conveying speed of the first read-convey portion E for conveying the original document 1 to shorten a time period to send the original document 1 to the first read-convey portion E.

When the entrance sensor 15 detects the leading edge of the original document 1, the controller 100 starts decreasing the conveying speed for conveying the original document 1 to a speed equivalent to a reading speed for reading an image on the original document 1, before the leading edge of the original document 1 enters a nip portion formed between an upper roller and a lower roller of the entrance roller pair 16. Simultaneously, the controller 100 rotates the reading motor 103 depicted in FIG. 2 forward to drive the entrance roller pair 16, the exit roller pair 23, and the CIS exit roller pair 27.

When the registration sensor 17 detects the leading edge of the original document 1, the conveying speed for conveying the original document 1 decreases while the original document 1 is conveyed for a reference distance. The controller 100 stops the original document 1 temporarily before a reading position 20, and sends a registration stop signal to the main controller 111 via the I/F 107 depicted in FIG. 2. When the controller 100 receives a reading start signal sent from the main controller 111, the controller 100 increases the conveying speed for conveying the original document 1 to a reference conveying speed until the leading edge of the original document 1 stopped before the reading position 20 reaches the reading position 20. At a time when the leading edge of the original document 1 reaches the first read-convey portion E, which is detected by a pulse count of the reading motor 103 depicted in FIG. 2, the controller 100 sends a gate signal indicating a valid image region in a sub-scanning direction on the front side of the original document 1 to the main controller 111 until the trailing edge of the original document 1 passes through the first read-convey portion E.

When the user selects the one-sided mode for reading an image on the front side of the original document 1, the original document 1, which passes through the first read-convey portion E, is conveyed to the original discharge portion G through the second read-convey portion. F. When the discharging sensor 24 detects the leading edge of the original document 1, the controller 100 rotates the discharging motor 104 depicted in FIG. 2 forward to rotate an upper roller of the discharging roller pair 28 counterclockwise in FIG. 1. Based on a pulse count of the discharging motor 104 counted after the discharging sensor 24 detects the leading edge of the original document 1, the controller 100 decreases a driving speed of the discharging motor 104 immediately before the trailing edge of the original document 1 passes through a nip portion formed between the upper roller and a lower roller of the discharging roller pair 28, so that the original document 1 does not drop from the original discharge tray 29 when the discharging roller pair 28 discharges the original document 1 onto the original discharge tray 29.

When the user selects the two-sided mode for reading an image on the front side and the back side of the original document 1, based on a pulse count of the reading motor 103 depicted in FIG. 2 counted after the discharging sensor 24 detects the leading edge of the original document 1, the controller 100 sends a gate signal indicating a valid image region in the sub-scanning direction on the back side of the original document 1 to the second reading member 25 at a time when the leading edge of the original document 1 reaches the second reading member 25 until the trailing edge of the original document 1 passes through the second read-convey portion F. A surface of the second reading member 25 is coated to prevent a sticky substance on the original document 1 from moving onto a reading line on the second reading member 25 and therefore generating a streak on a read image.

The second reading roller 26 presses the original document 1 against the second reading member 25, and serves as a reference white member for obtaining shading data at the second reading member 25. The second reading roller 26 is disposed opposite the second reading member 25 to support an original document 1 with respect to the second reading member 25. A surface of the second reading roller 26 has a substantially uniform surface density.

Referring to FIG. 3, the following describes the second reading member 25. When the light source 200 including an LED (light-emitting diode) is turned on by an ON signal sent from the controller 100, the light source 200 emits light onto an original document 1 supported by the second reading roller 26 depicted in FIG. 1. A lens gathers the light reflected by the original document 1 into the CCD sensor chip 201 so that the CCD sensor chip 201 converts the light into an electric signal (e.g., an analog signal), and sends the analog signal to the amplifier 202. The amplifier 202 amplifies the analog signal, and sends the amplified analog signal to the A/D converter 203. The A/D converter 203 converts the amplified analog signal into a digital signal, and sends the digital signal to the image processor 204. The image processor 204 generates image data according to the digital signal, and sends the image data to the frame memory 205. The frame memory 205 expands and stores the image data. The output control circuit 206 sends the image data stored in the frame memory 205 to the main controller 111 via the I/F circuit 207. The main controller 111 sends the image data to the image processing circuit 113. Thus, the image data obtained by reading an image on the back side of the original document 1 by the second reading member 25 is sent to the image processing circuit 113.

Figure 4:
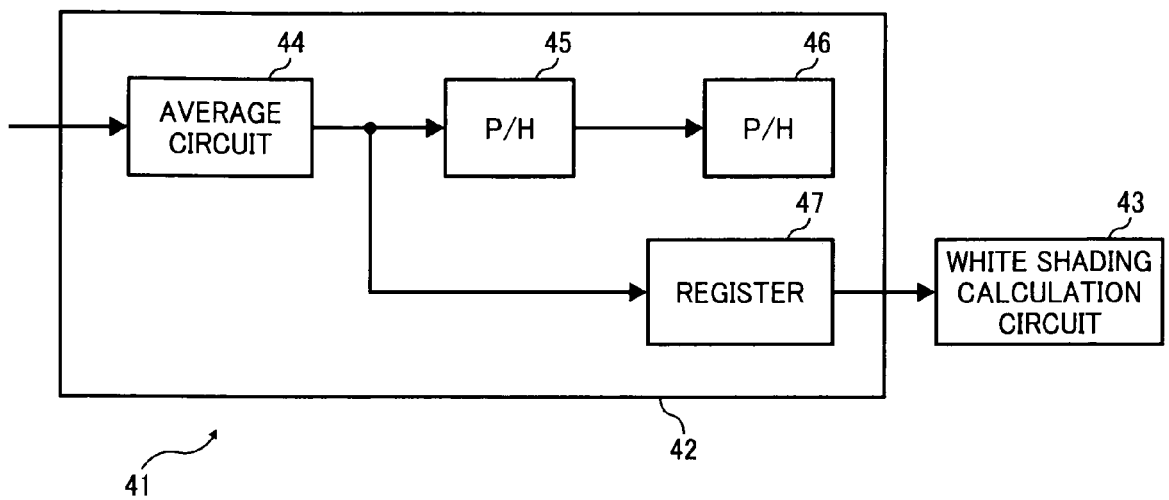
FIG. 4 is a block diagram (according to an example embodiment) of a white shading correction circuit included in the image processing circuit shown in FIG. 3.
Figure 5:
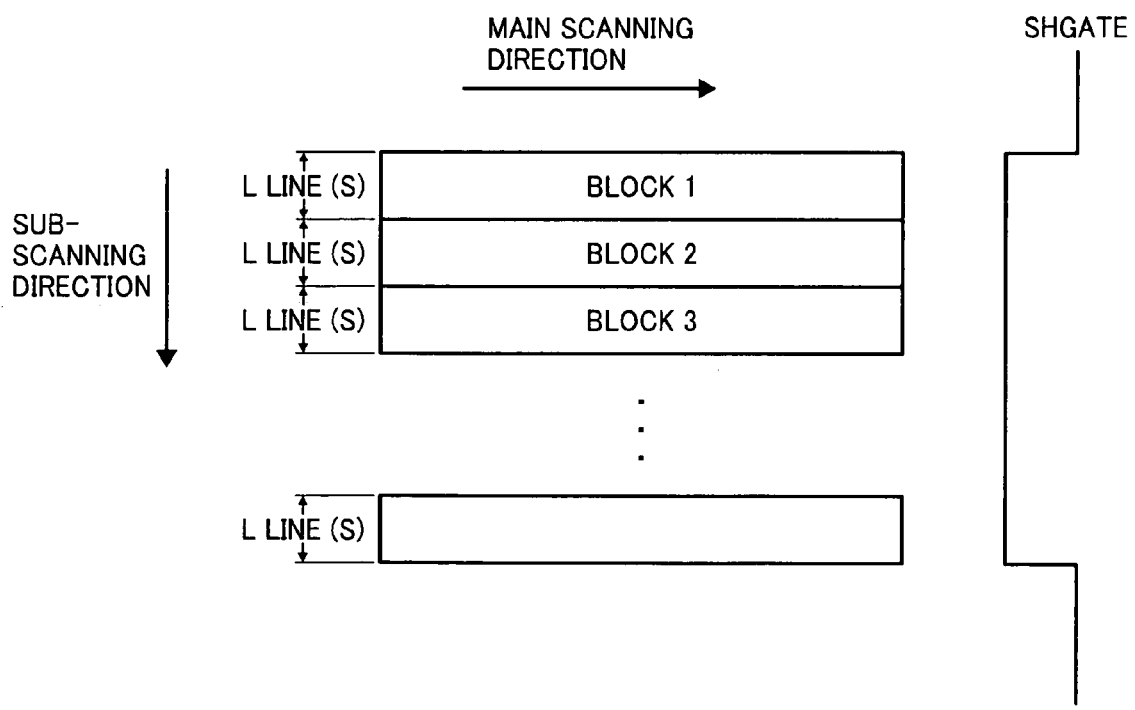
FIG. 5 is a diagram (according to an example embodiment) illustrating processing performed in an average circuit included in the white shading correction circuit shown in FIG. 4.

Referring to FIGS. 4 and 5, the following describes the white shading correction circuit 41 included in the image processing circuit 113 depicted in FIG. 3. FIG. 4 is a block diagram of the white shading correction circuit 41. As illustrated in FIG. 4, the white shading correction circuit 41 includes a white shading data generation circuit 42 and/or a white shading calculation circuit 43. The white shading data generation circuit 42 includes an average circuit 44, peak hold circuits 45 and 46, and/or a register 47.

FIG. 5 is a diagram illustrating processing performed in the average circuit 44 depicted in FIG. 4.

As illustrated in FIG. 4, the white shading data generation circuit 42 serves as a white shading data generation device for generating white shading data. The white shading calculation circuit 43 serves as a white shading calculation device. The controller 100 depicted in FIG. 3 outputs a gate signal XSH-GATE to cause the second reading member 25 depicted FIG. 3 to read a given range on the second reading roller 26 depicted in FIG. 1 to generate image data.

The image data enters the average circuit 44 depicted in FIG. 4. As illustrated in FIG. 5, the average circuit 44 divides the image data into a number of blocks m (e.g., blocks 1, 2, and 3) per a number of lines L to calculate a simple average of the number of lines L in each block. Namely, the average circuit 44 calculates a simple average of pixels in each line in each block. Thus, the average circuit 44 serves as an averaging member. The calculated simple average is stored into the register 47 serving as a storage device or a storage. The peak hold circuit 45 calculates a peak value of the simple average of pixels per block. In other words, the peak hold circuit 45 calculates a peak value of the simple average of pixels in a main scanning direction. Thus, the peak hold circuit 45 serves as a first peak calculator.

The peak hold circuit 46 calculates a peak value of the peak values calculated by the peak hold circuit 45 per block. Thus, the peak hold circuit 46 serves as a second peak calculator. The register 47 outputs the simple average calculated by the average circuit 44 corresponding to a block having the peak value calculated by the peak hold circuit 46 to the white shading calculation circuit 43 as white shading data. Thus, the register 47 serves as a determination member.

The following describes formulas showing processes performed by the white shading data generation circuit 42. The calculation of the simple average in each block, which is performed by the average circuit 44, is shown by the following formula (1).

$$Dm(n) = INT[\Sigma D(n)/L] \quad (1)$$

In the above formula (1), $Dm(n)$ represents calculation data of a "n"th pixel in a "m"th block. Lines in the "m"th block are shown in a range of $m*L$ to $(m+1)*L-1$. $D(n)$ represents read data in the "n"th pixel. $\Sigma D(n)$ represents summation of 1 as $D(n)$ to a number of lines L. L represents a number of lines in one block. INT [ ] represents rounding off a number to the nearest integer.

The calculation of the peak value in each block, which is performed by the peak hold circuit 45, is shown by the following formula (2).

$$Dm\max = Dm(n) \quad (2)$$

In the above formula (2), Dmmax represents a peak value in the "m"th block.

The calculation of the peak value in the gate signal XSH-GATE, which is performed by the peak hold circuit 46, is shown by the following formula (3) or (4).

When Dpmax is smaller than Dmmax, $$Dp\max = Dm\max \quad (3)$$

When Dpmax is not smaller than Dmmax, $$Dp\text{max}=Dp\text{max} \qquad (4)$$

In the above formulas (3) and (4), Dpmax represents a peak value in the number of blocks m. In the first block, Dpmax equals to Dmmax.

Shading data corresponds to data in the "m"th block having Dmmax.

The calculation of shading correction, which is performed by the white shading calculation circuit 43, is shown by the following formula (5).

$$Dsh=(D(n)/Dp(n))\times 255 \qquad (5)$$

In the above formula (5), Dp(n) represents shading data.

When data obtained by reading for one rotation of the second reading roller 26 depicted in FIG. 1 is divided into the "m" blocks, even when the second reading roller 26 is partially stained in a circumferential direction of the second reading roller 26, an unstained part of the second reading roller 26 provides white shading data stably. However, when the second reading roller 26 is new and clean, any part (e.g., block) of the second reading roller 26 may provide white shading data. By contrast, as the second reading roller 26 is stained due to scraping by an original document 1, a smaller region on the second reading roller 26 provides the peak value (e.g., white shading data) calculated by the peak hold circuit 46. When an entire circumferential surface of the second reading roller 26 is stained, level of shading data deteriorates in a particular pixel, degrading uniformity in image density.

Figure 6A:
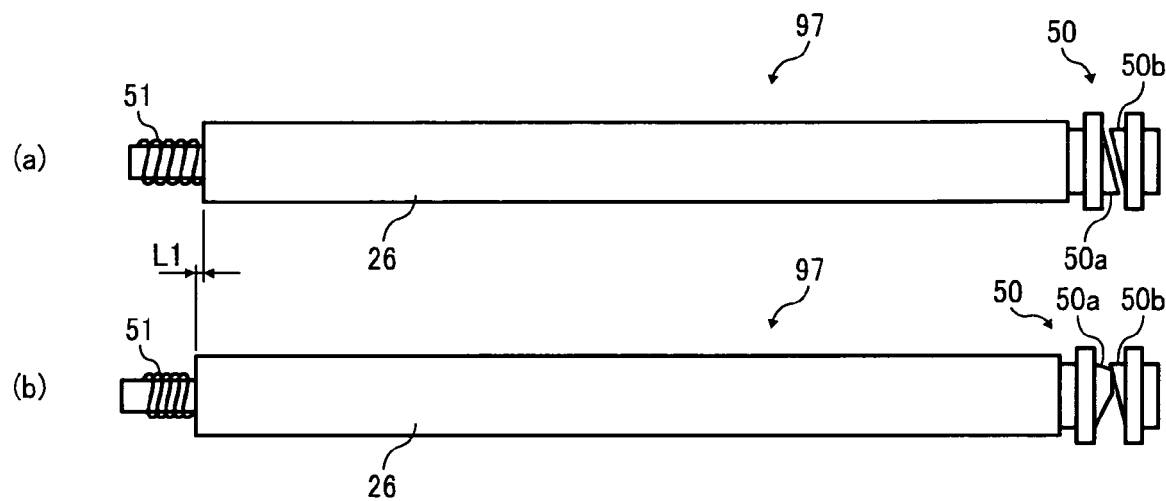
FIG. 6A is a plane view (according to an example embodiment) of an image reader included in the image forming apparatus shown in FIG. 1.

To address this problem, the image reader 97 depicted in FIG. 1 further includes a structure to move the second reading roller 26 in the main scanning direction as illustrated in FIG. 6A. FIG. 6A is a plane view of the second reading roller 26. As illustrated in FIG. 6A, the image reader 97 includes a cam 50 and/or a pressing member 51. The cam 50 includes a movable member 50a and/or a fixed member 50b.

Figure 6B:
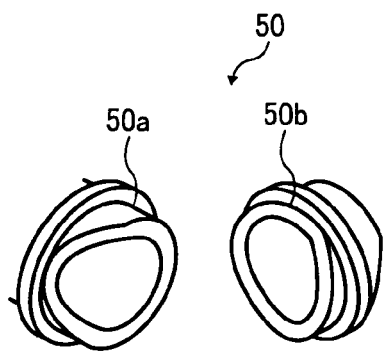
FIG. 6B is an enlarged perspective view (according to an example embodiment) of a cam included in the image reader shown in FIG. 6A.

FIG. 6B is an enlarged perspective view of the movable member 50a and the fixed member 50b.

As illustrated in FIG. 6A, the cam 50 serves as a guide moving member for moving the second reading roller 26 serving as a guide in the main scanning direction in which the second reading member 25 (depicted in FIG. 1) serving as a reading member scans an outer surface of the second reading roller 26, which is perpendicular to a direction of rotation of the second reading roller 26, that is, the sub-scanning direction. Thus, shading data can be obtained at a plurality of positions in a single pixel in the main scanning direction. Namely, shading data can be obtained at a clean part of the second reading roller 26, that is, a part of the second reading roller 26 other than a stained part of the second reading roller 26.

The second reading roller 26 serves as a guide and a correction board. The cam 50 is provided at one end of the second reading roller 26 in an axial direction of the second reading roller 26, that is, the main scanning direction. The pressing member 51 (e.g., a coil spring) is provided at another end of the second reading roller 26 in the main scanning direction, and applies pressure to the second reading roller 26 in the main scanning direction. The second reading roller 26 is connected to the reading motor 103 via the roller clutch 301 depicted in FIG. 2. In other words, the reading motor 103 rotates the second reading roller 26 via the roller clutch 301. Thus, the reading motor 103 serves as a guide rotating member for rotating the second reading roller 26 serving as a guide in the sub-scanning direction. The cam 50 serves as a guide moving member for moving the second reading roller 26 serving as a guide in the main scanning direction. The guide rotating member and the guide moving member serve as a guide driver for driving the second reading roller 26 serving as a guide.

As illustrated in FIG. 6B, the movable member 50a of the cam 50 includes a chamfer and is provided at one end of the second reading roller 26 in the axial direction of the second reading roller 26, that is, the main scanning direction. The fixed member 50b of the cam 50 is fixedly mounted in the image reader 97 of the ADF 98 depicted in FIG. 1 and includes a chamfer to contact the movable member 50a. As illustrated in FIG. 6A, the pressing member 51 presses the second reading roller 26 against the cam 50. The rotation of the second reading roller 26 changes a contact state of the movable member 50a for contacting the fixed member 50b so as to move the second reading roller 26 back and forth in the main scanning direction in which the second reading member 25 depicted in FIG. 1 scans the outer surface of the second reading roller 26.

The movable member 50a is provided at one end of a cylinder of the second reading roller 26, and rotates in accordance with the rotation of the second reading roller 26. The fixed member 50b is fixedly mounted in the image reader 97 of the ADF 98 depicted in FIG. 1. The fixed member 50b includes the chamfer equivalent to the chamfer of the movable member 50a. The pressing member 51 presses the second reading roller 26 against the cam 50 to cause the movable member 50a to contact the fixed member 50b constantly. As the second reading roller 26 rotates, a state in which the chamfer of the movable member 50a contacts the chamfer of the fixed member 50b changes. When a state (a) in which an inclination of the chamfer of the movable member 50a corresponds to an inclination of the chamfer of the fixed member 50b as illustrated in FIG. 6A (a) transits to a state (b) in which a top of the chamfer of the movable member 50a contacts a top of the chamfer of the fixed member 50b as illustrated in FIG. 6A (b) after the second reading roller 26 rotates by 180 degrees, the second reading roller 26 moves for a distance L1 in the axial direction of the second reading roller 26, that is, the main scanning direction.

When the second reading roller 26 rotates one cycle, the second reading roller 26 moves back and forth in the main scanning direction at least once. Accordingly, when the second reading roller 26 rotates a half turn, the second reading roller 26 moves for the distance L1 in the main scanning direction. Alternatively, when the second reading roller 26 rotates one cycle, the second reading roller 26 may move back and forth in the main scanning direction twice. Accordingly, when the second reading roller 26 rotates a quarter turn, the second reading roller 26 may move for the distance L1 in the main scanning direction to shorten an ON time period of a gate signal SHGATE. When the distance L1 is at least twice as great as a minimum pixel read by the second reading member 25, even when a portion of the second reading roller 26 corresponding to a particular pixel is stained, movement of the second reading roller 26 in the main scanning direction prevents the second reading member 25 from scanning the stained portion of the second reading roller 26.

Figure 7A:
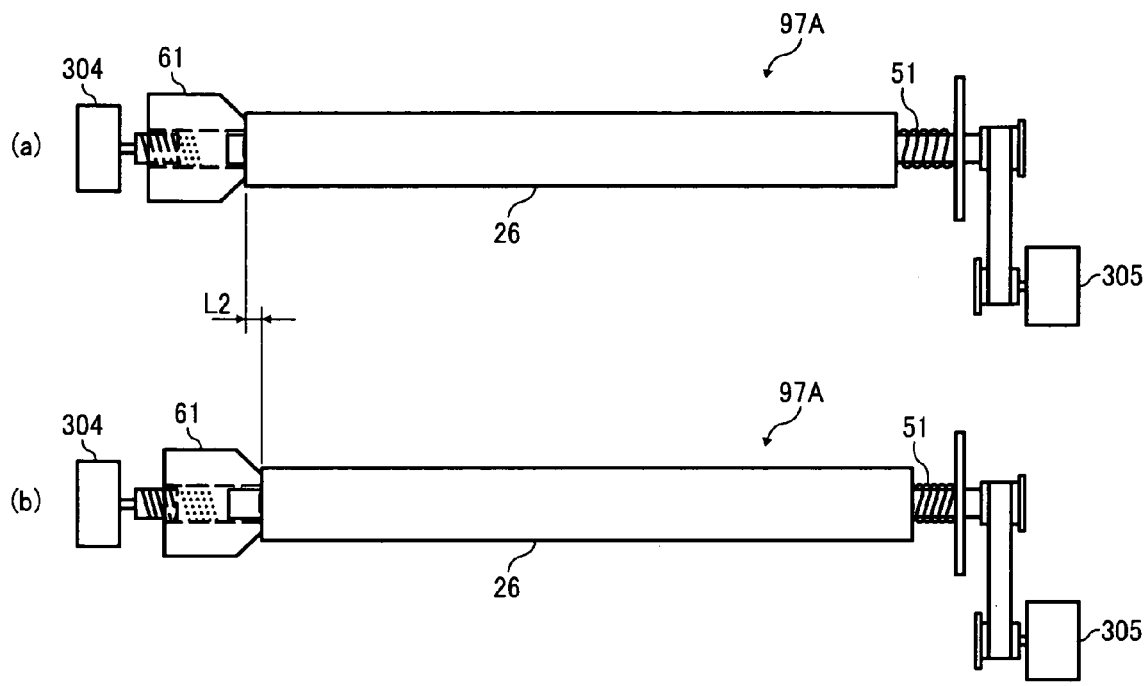
FIG. 7A is a plane view of an image reader according to another example embodiment.
Figure 7B:
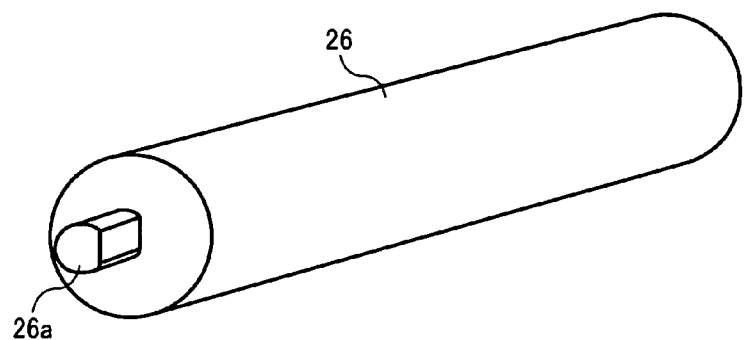
FIG. 7B is a perspective view (according to an example embodiment) of a second reading roller included in the image reader shown in FIG. 7A.

FIG. 7A is a plane view of an image reader 97A according to another example embodiment. The image reader 97A includes the second reading roller 26, the pressing member 51, the roller moving motor 304, a bearing 61, and/or a roller driver 305. FIG. 7B is a perspective view of the second reading roller 26. The second reading roller 26 includes a driving shaft 26a.

The roller moving motor 304 serves as a guide moving member for moving the second reading roller 26 serving as a guide and a correction board in the main scanning direction.

The roller driver 305 serves as a guide rotating member for rotating the second reading roller 26 in the sub-scanning direction. The controller 100 depicted in FIG. 2 drives the roller driver 305 independently of the roller moving motor 304. Alternatively, the reading motor 103 depicted in FIG. 2, instead of the roller driver 305, may rotate the second reading roller 26 via the roller clutch 301 depicted in FIG. 2.

A screw mechanism connects the roller moving motor 304 to the bearing 61 for supporting the second reading roller 26. When the roller moving motor 304 rotates, the bearing 61 moves back and force for a distance L2 in the axial direction of the second reading roller 26, that is, the main scanning direction. Like in the image reader 97 depicted in FIG. 6A, while the pressing member 51 presses the second reading roller 26 against the bearing 61 in one direction, the roller moving motor 304 moves the bearing 61 in the main scanning direction. Accordingly, the second reading roller 26 moves in the axial direction of the second reading roller 26.

As illustrated in FIG. 7B, the driving shaft 26a of the second reading roller 26 has a D-like shape in cross-section. The driving shaft 26a moves in a thrust direction, and transmits a driving force generated by the roller driver 305 depicted in FIG. 7A to the second reading roller 26.

Figure 8:
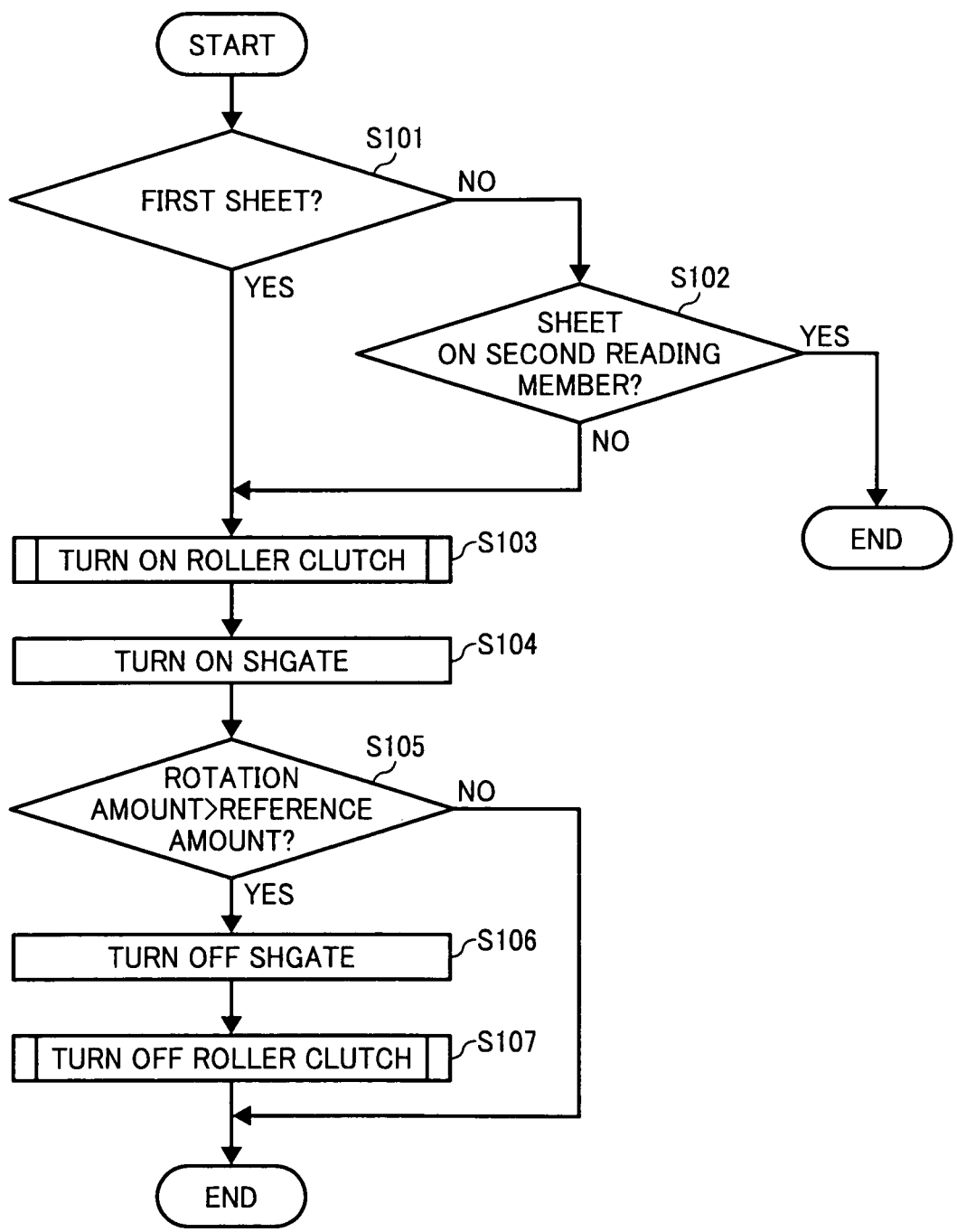
FIG. 8 is a flowchart (according to an example embodiment) illustrating a moving control for moving a second reading roller included in the image reader shown in FIG. 6A.

Referring to FIG. 8, the following describes a moving control for moving the second reading roller 26 depicted in FIG. 6A. FIG. 8 is a flowchart illustrating the moving control for moving the second reading roller 26.

In step S101, the controller 100 (depicted in FIG. 2) judges whether an original document 1 is a first sheet or not. When the controller 100 judges that the original document 1 is the first sheet (e.g., when YES is selected in step S101), the controller 100 turns on the roller clutch 301 (depicted in FIG. 2) to rotate the reading motor 103 (depicted in FIG. 2) in step S103, and turns on a gate signal SHGATE in step S104. In step S105, the controller 100 judges whether or not a rotation amount of the reading motor 103 corresponding to a moving amount of the second reading roller 26 exceeds a reference amount (e.g., the distance L1 depicted in FIG. 6A). When the controller 100 judges that the rotation amount of the reading motor 103 exceeds the reference amount (e.g., when YES is selected in step S105), the controller 100 turns off the gate signal SHGATE in step S106, and turns off the roller clutch 301 in step S107.

When the controller 100 judges that the original document 1 is not the first sheet (e.g., when NO is selected in step S101), the controller 100 judges whether or not the original document 1 is on the second reading member 25 (depicted in FIG. 1) in step S102. When the controller 100 judges that the original document 1 is on the second reading member 25 (e.g., when YES is selected in step S102), the controller 100 finishes the moving control for moving the second reading roller 26.

When the controller 100 judges that the original document 1 is not on the second reading member 25 (e.g., when NO is selected in step S102), steps S103 to S107 are performed. Thus, the controller 100 moves the second reading roller 26 when the first sheet of original documents 1 placed on the movable original tray 3 depicted in FIG. 1 is fed and when no original document 1 is on the second reading member 25 in an interval between successive readings of an image on the original documents 1.

Figure 9:
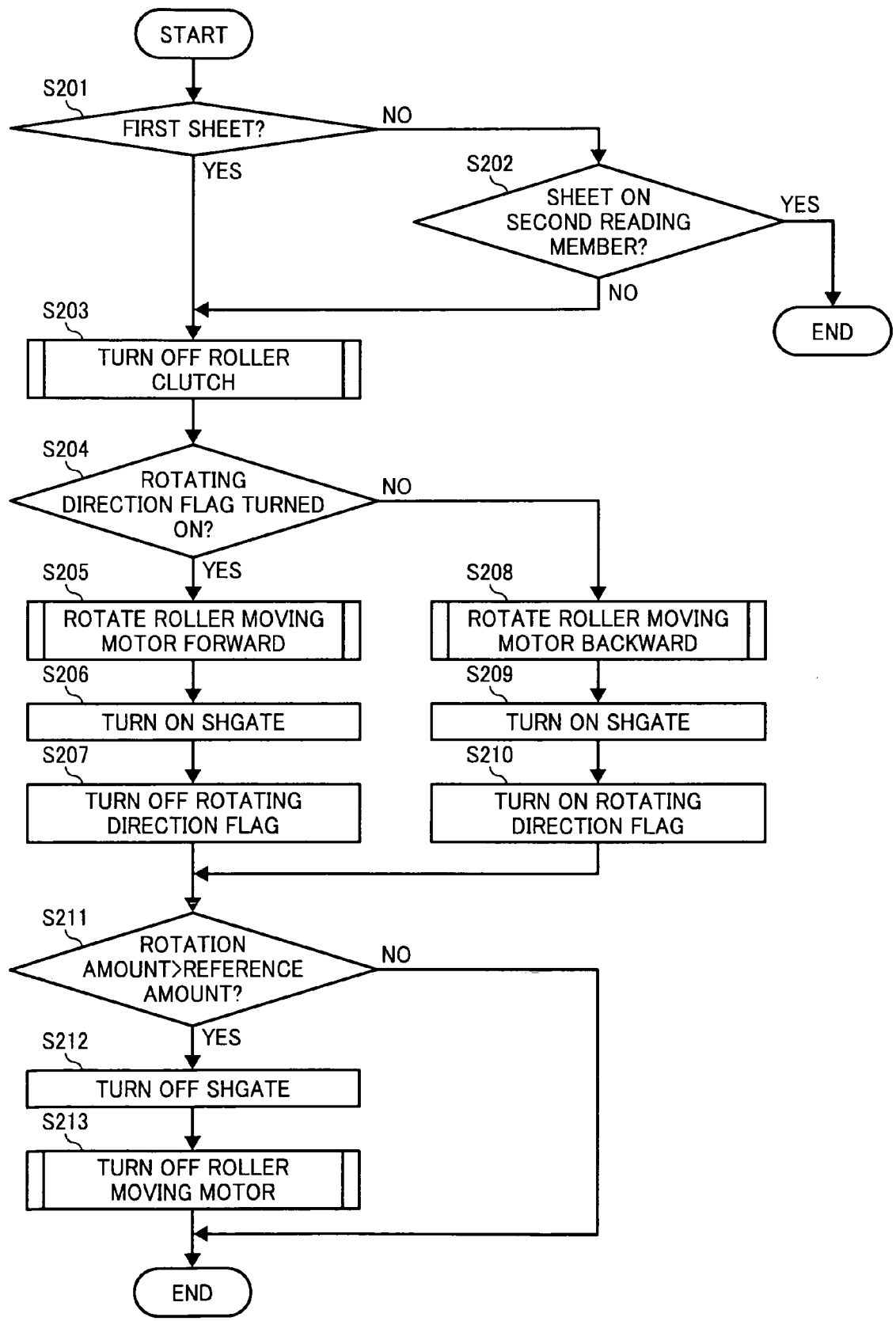
FIG. 9 is a flowchart (according to an example embodiment) illustrating a moving control for moving a second reading roller included in the image reader shown in FIG. 7A.

Referring to FIG. 9, the following describes a moving control for moving the second reading roller 26 depicted in FIG. 7A. FIG. 9 is a flowchart illustrating the moving control for moving the second reading roller 26.

In step S201, the controller 100 (depicted in FIG. 2) judges whether an original document 1 is a first sheet or not. When the controller 100 judges that the original document 1 is the first sheet (e.g., when YES is selected in step S201), the controller 100 turns off the roller clutch 301 (depicted in FIG. 2) in step S203 when the reading motor 103 (depicted in FIG. 2) drives the second reading roller 26. In step S204, the controller 100 checks whether or not a rotating direction flag for defining a moving direction of the second reading roller 26 is turned on. When the controller 100 judges that the rotating direction flag is turned on (e.g., when YES is selected in step S204), the controller 100 rotates the roller moving motor 304 depicted in FIG. 7A forward in step S205, turns on a gate signal SHGATE in step S206, and turns off the rotating direction flag in step S207. In step S211, the controller 100 judges whether or not a rotation amount of the roller moving motor 304 corresponding to a moving amount of the second reading roller 26 exceeds a reference amount (e.g., the distance L2 depicted in FIG. 7A). When the moving amount of the second reading roller 26 exceeds the reference amount (e.g., when YES is selected in step S211), the controller 100 turns off the gate signal SHGATE in step S212. In step S213, the controller 100 turns off the roller moving motor 304.

When the controller 100 judges that the rotating direction flag is turned off (e.g., when NO is selected in step S204), the controller 100 rotates the roller moving motor 304 backward in step S208, turns on the gate signal SHGATE in step S209, and turns on the rotating direction flag in step S210 until the moving amount of the second reading roller 26 exceeds the reference amount. When the moving amount of the second reading roller 26 exceeds the reference amount (e.g., when YES is selected in step S211), the controller 100 turns off the gate signal SHGATE in step S212, and turns off the roller moving motor 304 in step S213.

When the controller 100 judges that the original document 1 is not the first sheet (e.g., when NO is selected in step S201), the controller 100 judges whether or not the original document 1 is on the second reading member 25 (depicted in FIG. 1) in step S202. When the controller 100 judges that the original document 1 is on the second reading member 25 (e.g., when YES is selected in step S202), the controller 100 finishes the moving control for moving the second reading roller 26.

When the controller 100 judges that the original document 1 is not on the second reading member 25 (e.g., when NO is selected in step S202), steps S203 to S213 are performed. Thus, the controller 100 moves the second reading roller 26 when the first sheet of original documents 1 placed on the movable original tray 3 depicted in FIG. 1 is fed and when no original document 1 is on the second reading member 25 in an interval between successive readings of an image on the original documents 1.

The controller 100 drives the roller moving motor 304 to move the second reading roller 26 in the main scanning direction when the first sheet of original documents 1 placed on the movable original tray 3 is fed or when no original document 1 is on the second reading member 25 in an interval between successive readings of an image on the original documents 1. In this case, a rotation amount of the roller moving motor 304 corresponds to the distance L2 depicted in FIG. 7A for which the second reading roller 26 moves in the main scanning direction, and a direction of rotation of the roller moving motor 304 changes every rotation. The controller 100 turns off the roller clutch 301 to stop rotating the roller moving motor 304. Thus, the controller 100 can drive the roller moving motor 304 independently to move the second reading roller 26 in the main scanning direction.

Figure 10:
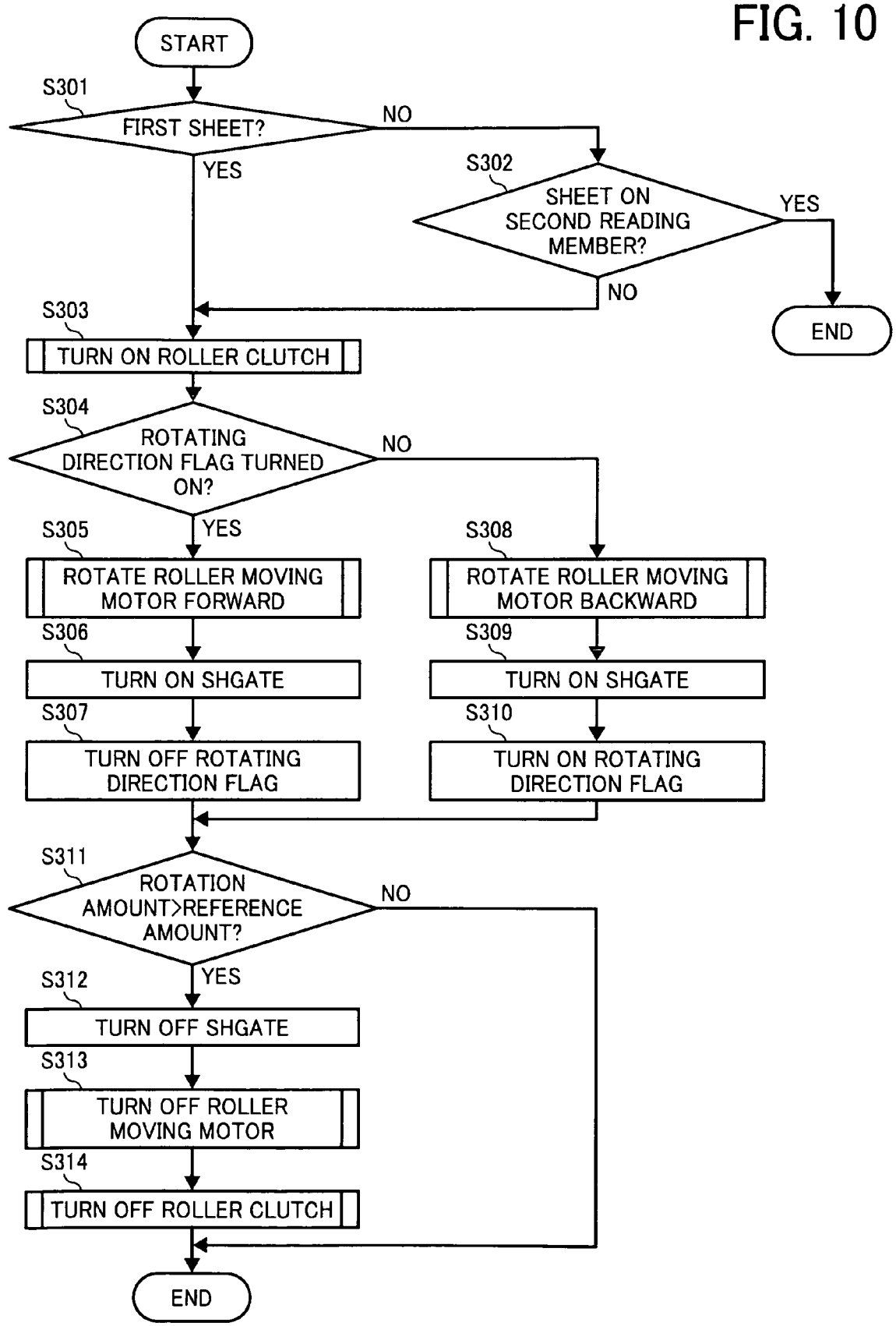
FIG. 10 is a flowchart (according to an example embodiment) illustrating another moving control for moving a second reading roller included in the image reader shown in FIG. 7A.

Referring to FIG. 10, the following describes another moving control for moving the second reading roller 26 depicted in FIG. 7A. FIG. 10 is a flowchart illustrating the moving control for moving the second reading roller 26.

In step S301, the controller 100 (depicted in FIG. 2) judges whether an original document 1 is a first sheet or not. When the controller 100 judges that the original document 1 is the first sheet (e.g., when YES is selected in step S301), the controller 100 turns on the roller clutch 301 (depicted in FIG. 2) in step S303 when the reading motor 103 (depicted in FIG. 2) drives the second reading roller 26. In step S304, the controller 100 checks whether or not a rotating direction flag for defining a moving direction of the second reading roller 26 is turned on. When the controller 100 judges that the rotating direction flag is turned on (e.g., when YES is selected in step S304), the controller 100 rotates the roller moving motor 304 depicted in FIG. 7A forward in step S305, turns on a gate signal SHGATE in step S306, and turns off the rotating direction flag in step S307. In step S311, the controller 100 judges whether or not a rotation amount of the roller moving motor 304 corresponding to a moving amount of the second reading roller 26 exceeds a reference amount (e.g., the distance L2 in FIG. 7A). When the moving amount of the second reading roller 26 exceeds the reference amount (e.g., when YES is selected in step S311), the controller 100 turns off the gate signal SHGATE in step S312. In step S313, the controller 100 turns off the roller moving motor 304. In step S314, the controller 100 turns off the roller clutch 301.

When the controller 100 judges that the rotating direction flag is turned off (e.g., when NO is selected in step S304), the controller 100 rotates the roller moving motor 304 backward in step S308, turns on the gate signal SHGATE in step S309, and turns on the rotating direction flag in step S310 until the moving amount of the second reading roller 26 exceeds the reference amount. When the moving amount of the second reading roller 26 exceeds the reference amount (e.g., when YES is selected in step S311), the controller 100 turns off the gate signal SHGATE in step S312, turns off the roller moving motor 304 in step S313, and turns off the roller clutch 301 in step S314.

When the controller 100 judges that the original document 1 is not the first sheet (e.g., when NO is selected in step S301), the controller 100 judges whether or not the original document 1 is on the second reading member 25 in step S302. When the controller 100 judges that the original document 1 is on the second reading member 25 (e.g., when YES is selected in step S302), the controller 100 finishes the moving control for moving the second reading roller 26.

When the controller 100 judges that the original document 1 is not on the second reading member 25 (e.g., when NO is selected in step S302), steps S303 to S314 are performed. Thus, the controller 100 turns off the roller clutch 301 to prevent a driving force generated by the reading motor 103 from transmitting to the second reading roller 26. Accordingly, movement of the second reading roller 26 in the main scanning direction is interlocked with rotation of the second reading roller 26.

According to the above-described example embodiments, a guide (e.g., the second reading roller 26 depicted in FIG. 1), which functions as a correction board, moves in the main scanning direction in which a reading member (e.g., the second reading member 25 depicted in FIG. 1) scans a surface of the guide, and rotates in the sub-scanning direction, so as to generate a plurality of shading data. Thus, even when a part of the guide is stained, the reading member can scan a clean part, which is not stained, on the surface of the guide to generate shading data.

The guide is a roller having a substantially uniform surface density. Thus, a controller (e.g., the controller 100 depicted in FIG. 2) rotates the roller so that the reading member scans the clean part on the surface of the guide to generate shading data.

The guide can move in the main scanning direction while rotating in the sub-scanning direction. Thus, even when a foreign substance is adhered to the surface of the guide in a circumferential direction of the guide, the reading member can scan a clean part on the surface of the guide to generate shading data.

The guide moves in the main scanning direction over a distance at least twice as great as one dot of basic resolution of the reading member. Accordingly, the movement of the guide causes the reading member to scan a clean part on the surface of the guide.

The guide rotates and moves when the controller starts feeding the first sheet of original documents placed on the movable original tray 3 depicted in FIG. 1, that is, before the first sheet reaches the guide, reducing power consumption and suppressing degradation of sheet conveyance performance.

The guide rotates and moves in an interval between successive readings of a plurality of original documents conveyed to the guide by the reading member. Thus, the reading member can scan a clean part on the surface of the guide to generate shading data during an interval between the successively conveyed original documents without degrading scanning efficiency.

The controller controls rotation of the guide having a roller shape independently of control of movement of the guide in the main scanning direction. In other words, the controller selectively controls rotation of the guide while moving the guide in the main scanning direction or rotation of the guide while not moving the guide in the main scanning direction, providing improved flexibility in control for feeding an original document.

When the controller starts feeding the first sheet of original documents placed on the movable original tray 3, the controller moves the guide only in the main scanning direction, reducing noise and power consumption.

When the controller starts feeding the first sheet of original documents placed on the movable original tray 3, the guide moves in the main scanning direction while the guide rotates. Accordingly, even when a foreign substance is adhered to the surface of the guide in the circumferential direction, the reading member can scan a clean part on the surface of the guide to generate shading data.

When the reading member reads an image on an original document, the controller rotates the guide without moving the guide in the main scanning direction. In other words, when the reading member reads an image on an original document, the controller feeds the original document without moving the guide in the main scanning direction, improving image reading quality.

The guide may be a white board movable in the main scanning direction in which the reading member scans the surface of the guide. Accordingly, even when a part of the guide is stained or adhered with a foreign substance due to conveyance of original documents, the reading member can scan a clean part on the surface of the guide to generate shading data.

As described above, an image reader (e.g., the image reader 97 depicted in FIG. 6A or the image reader 97A depicted in FIG. 7A) is included in an auto document feeder (e.g., the ADF 98 depicted in FIG. 1). Accordingly, the image reader can read an image on front and back sides of an original document precisely at high speed.

The auto document feeder is included in an image forming apparatus (e.g., the image forming apparatus 99 depicted in FIG. 1). Accordingly, the image forming apparatus can read an image on the front and back sides of an original document to generate image data, send the image data to an image forming device, and form an image on a recording medium with the image forming device precisely at high speed.

The present invention has been described above with reference to specific example embodiments. Nonetheless, the present invention is not limited to the details of example embodiments described above, but various modifications and improvements are possible without departing from the spirit and scope of the present invention. It is therefore to be understood that within the scope of the associated claims, the present invention may be practiced otherwise than as specifically described herein. For example, elements and/or features of different illustrative example embodiments may be combined with each other and/or substituted for each other within the scope of the present invention.

What is claimed is:

1. An image reader, comprising:
   a reading member fixedly mounted in the image reader to read an image on a sheet conveyed into the image reader;
   a guide disposed opposite the reading member to support the sheet with respect to the reading member;
   a guide moving member, provided at one end of the guide, to move the guide with respect to the reading member in a main scanning direction in which the reading member reads the image on the sheet;
   a pressing member, provided at the other end of the guide, to apply pressure to the guide in the main scanning direction;
   a guide rotating member to rotate the guide in a sub-scanning direction perpendicular to the main scanning direction; and
   a controller to control the reading member to scan different positions on the guide moved by the guide moving member and rotated by the guide rotating member to generate shading data,
      wherein the guide moving member includes a movable member and a fixed member,
      the movable member of the guide moving member includes a chamfer and is provided at one end of the guide in an axial direction thereof, and
      the fixed member of the guide moving member includes a chamfer corresponding to the chamfer of the movable member and is fixedly mounted in the image reader.

2. The image reader according to claim 1, wherein the guide comprises a reference board scanned by the reading member to generate the shading data.

3. The image reader according to claim 1, wherein the guide comprises a roller having a substantially uniform surface density.

4. The image reader according to claim 1, wherein the guide moving member moves the guide in the main scanning direction while the guide rotating member rotates the guide in the sub-scanning direction.

5. The image reader according to claim 1, wherein the guide moving member moves the guide in the main scanning direction over a distance at least twice as great as one dot of basic resolution of the reading member.

6. The image reader according to claim 1, wherein the guide moving member moves the guide in the main scanning direction when feeding of a first sheet of a plurality of sheets begins.

7. The image reader according to claim 1, wherein the guide moving member moves the guide in an interval between successive readings of a plurality of sheets conveyed to the guide by the reading member.

8. The image reader according to claim 1, wherein a rotation of the guide changes a contact state of the movable member for contacting the fixed member so as to move the guide back and forth in the main scanning direction.

9. The image reader according to claim 1, wherein the pressing member presses the guide against the guide moving member to cause the movable member to contact the fixed member constantly.

10. The image reader according to claim 1, wherein when the guide rotates one cycle, the guide moves back and forth in the main scanning direction.

11. The image reader according to claim 1, wherein when the guide rotates a half turn, the guide moves a distance L1 in the main scanning direction.

12. The image reader according to claim 1, wherein shading data is obtained at a plurality of positions in a single pixel in the main scanning direction, corresponding to a clean part of the guide.

13. An image reader comprising:
    a reading member fixedly mounted in the image reader to read an image on a sheet conveyed into the image reader;
    a guide disposed opposite the reading member to support the sheet with respect to the reading member;
    a guide moving member, provided at one end of the guide, to move the guide with respect to the reading member in a main scanning direction in which the reading member reads the image on the sheet;
    a bearing to support the guide and movable in the main scanning direction;
    a pressing member, provided at the other end of the guide, to apply pressure to the guide in the main scanning direction against the bearing;
    a guide rotating member to rotate the guide in a sub-scanning direction perpendicular to the main scanning direction; and
    a controller to control the reading member to scan different positions on the guide moved by the guide moving member and rotated by the guide rotating member to generate shading data;
    wherein the controller controls the guide rotating member to rotate the guide in the sub-scanning direction and the guide moving member to move the guide via the bearing in the main scanning direction independently.

14. The image reader according to claim 13, wherein the controller controls the guide moving member separately from the guide rotating member to move the guide in the main scanning direction when feeding of a first sheet of a plurality of sheets begins.

15. The image reader according to claim 13, wherein the controller controls the guide moving member to move the guide in the main scanning direction while the guide is rotated by the guide rotating member when feeding of a first sheet of a plurality of sheets begins.

16. The image reader according to claim 13, wherein the controller causes the guide rotating member to rotate the guide in the sub-scanning direction without causing the guide moving member to move the guide in the main scanning direction when the reading member reads the image on the sheet, and
    wherein the controller controls the guide moving member separately from the guide rotating member to move the guide in the main scanning direction in an interval between successive readings of a plurality of sheets conveyed to the guide by the reading member.

17. The image reader according to claim 13,
wherein the controller causes the guide rotating member to rotate the guide in the sub-scanning direction without causing the guide moving member to move the guide in the main scanning direction when the reading member reads the image on the sheet, and
wherein the controller causes the guide moving member to move the guide in the main scanning direction while the guide is rotated by the guide rotating member in an interval between successive readings of a plurality of sheets conveyed to the guide by the reading member.

18. An auto document feeder comprising an image reader, the image reader comprising:
a reading member fixedly mounted in the image reader to read an image on a sheet conveyed into the image reader;
a guide disposed opposite the reading member to support the sheet with respect to the reading member;
a guide moving member, provided at one end of the guide, to move the guide with respect to the reading member in a main scanning direction in which the reading member reads the image on the sheet;
a pressing member, provided at the other end of the guide, to apply pressure to the guide in the main scanning direction;
a guide rotating member to rotate the guide in a sub-scanning direction perpendicular to the main scanning direction; and
a controller to control the reading member to scan different positions on the guide moved by the guide moving member and rotated by the guide rotating member to generate shading data,
wherein the guide moving member includes a movable member and a fixed member,
the movable member of the guide moving member includes a chamfer and is provided at one end of the guide in an axial direction thereof, and
the fixed member of the guide moving member includes a chamfer corresponding to the chamfer of the movable member and is fixedly mounted in the image reader.

19. An image forming apparatus including an auto document feeder including an image reader, the image reader comprising:
a reading member fixedly mounted in the image reader to read an image on a sheet conveyed into the image reader;
a guide disposed opposite the reading member to support the sheet with respect to the reading member;
a guide moving member, provided at one end of the guide, to move the guide with respect to the reading member in a main scanning direction in which the reading member reads the image on the sheet;
a pressing member, provided at the other end of the guide, to apply pressure to the guide in the main scanning direction;
a guide rotating member to rotate the guide in a sub-scanning direction perpendicular to the main scanning direction; and
a controller to control the reading member to scan different positions on the guide moved by the guide moving member and rotated by the guide rotating member to generate shading data,
wherein the guide moving member includes a movable member and a fixed member,
the movable member of the guide moving member includes a chamfer and is provided at one end of the guide in an axial direction thereof, and
the fixed member of the guide moving member includes a chamfer corresponding to the chamfer of the movable member and is fixedly mounted in the image reader.

* * * * *